Patented Aug. 28, 1928.

1,682,058

UNITED STATES PATENT OFFICE.

KOJI ANJOW, OF TOKYO FU, JAPAN, ASSIGNOR TO MITSUBISHI KOGYO KABUSHIKI, KAISHA, OF TOKYO, JAPAN, A CORPORATION OF JAPAN.

PROCESS FOR MAKING METALLIC TUNGSTEN.

No Drawing. Application filed July 3, 1926, Serial No. 120,532, and in Japan May 18, 1926.

This invention relates to a process of making technically pure metallic tungsten by treating with alkali or alkaline solution the impure metallic tungsten which is prepared by reduction of impure tungsten oxide. The object of the invention is to make pure metallic tungsten easily and economically from all kinds of material containing tungsten.

In order to obtain pure metallic tungsten from the substances containing tungsten, it has hitherto been necessary first to make pure tungsten oxide. This has been done either in the alkali process or the acid process in the following way:—

In the ordinary alkali process, the tungsten ore or other substance containing tungsten is treated first with alkali to convert tungsten into soluble alkali tungstate, which is then decomposed by acid in order to obtain insoluble tungsten oxide. In this case, silica, alumina and tin oxide which, are present in the original material as impurities consume alkali and acid during the treatment in just the same way as tungsten does and contaminate the resulting tungstate, and it is particularly difficult to get rid of silica in the precipitated oxide of tungsten. It was therefore absolutely necessary, for the purpose of making pure tungsten, to remove these impurities either by preliminary mechanical or physical treatment of the raw material or by purifying the alkali tungstate so that the precipitated tungsten oxide may remain free from these admixtures, when the tungstate is decomposed by acid.

In the acid process the impurities such as alumina, silica, tin oxide have to be removed from the raw material by physical or mechanical means before it is treated with acid, to obtain the tungsten oxide free from these impurities.

At any rate the tungsten oxide shows similar chemical reactions as silica and tin oxide, when treated either with alkali or acid, and therefore can be separated with a great deal of difficulty, giving rise to the waste of chemicals and labor in the course of separation and finally giving a poor yield of tungsten.

I have now found that metallic tungsten is not acted upon by alkali under certain conditions, while silica, alumina and tin are acted upon under the same conditions. I have further found that technically pure tungsten can be made more easily and more economically by treating with alkali such impure tungsten metal as obtained from crude tungsten oxide or from impure raw material, than by first purifying the starting substance or intermediate product, i. e. raw tungsten oxide. The following is an example of carrying my invention into practice:—

*Example 1.*—A mixture of finely powdered wolframite and sulphuric acid (15% by volume) in a ratio 100:400 parts is heated in an autoclave. The decomposition product is well washed, dried and reduced at the temperature of 1200° C. One hundred parts of the crude metallic tungsten thus obtained are heated in an autoclave with 100 parts of 15% caustic soda solution at 150° C. for half an hour. The impurities which are present in the crude metallic tungsten such as silica, alumina, or metallic tin, are dissolved by alkali under this condition, while the metallic tungsten remains intact and can be obtained in technically pure state after washing with water. In this way we can obtain metallic tungsten of 99.5% purity from crude metal containing 85.3% tungsten, 10.2% silica, 0.12% alumina, 0.5% tin, 3.0% tungsten oxide.

It will be obvious from the foregoing that, because of the high temperature maintained in the autoclave, a pressure considerably above atmospheric is developed and maintained during the treatment.

*Example 2.*—One hundred parts of finely powdered scheelite are heated with 500 parts of 15% (by weight) hydrochloric acid at 100° C. for one hour. The decomposition product is well washed, dehydrated and reduced at 1200° C. The crude metallic tungsten thus formed is heated in an adequate vessel with equal weight of 20% caustic soda solution at 100° C. for one hour and a half. The impurities present in the crude metal go into solution as will be seen from the following figures:—

Before the treatment: 93.3% W, 5.2% $SiO_2$, 0.12% $Al_2O_3$, 0.2% Sn;

After the treatment: 98.5% W.

*Example 3.*—Tin ore containing a small amount of tungsten is decomposed and after suitable treatment crude tungsten oxide containing a great deal of tin oxide and silica is reduced by means of charcoal. The crude metallic tungsten powder thus obtained is heated with caustic soda solution of 10% strength of the quantity 1.2 times as large at 120° C. for one hour. By this means metallic tungsten of 98.5% purity is obtained from crude metal containing 72.0% W, 8.7% SiO$_2$, 12.3% Sn and 2.5% tungsten oxide.

In all of the above examples, the purification is carried out, as will be readily seen, under non-oxidizing conditions.

I however do not wish to limit myself to the above examples, as the ratio of alkali, its concentration, the temperature and duration of heating can be changed in a wide range without affecting the result aimed at. It is also easy to attain the same object by using solid alkali instead of its aqueous solution, i. e., by fusing or roasting with alkali in a non-oxidizing atmosphere.

Having now particularly described and ascertained the nature of my said invention and in what manner the same is to be performed, I declare that what I claim is:

1. A process of treating crude metallic tungsten to obtain technically pure tungsten therefrom, which consists in heating the crude metallic tungsten with an aqueous solution of alkali in a closed vessel under pressure.

2. A process of producing technically pure tungsten, which consists in decomposing a substance containing tungsten with inorganic acid and then reducing the crude oxide of tungsten thus formed to metal and purifying the resulting crude metallic tungsten by heating the same with alkali.

3. A process of producing technically pure tungsten, which consists in decomposing a substance containing tungsten with inorganic acid in a closed vessel and then reducing the crude oxide of tungsten thus formed to metal and purifying the resulting crude metallic tungsten by heating the same with alkali.

4. A process of producing technically pure tungsten, which consists in decomposing a substance containing tungsten with inorganic acid in a closed vessel under pressure and then reducing the crude oxide of tungsten thus formed to metal and purifying the resulting crude metallic tungsten by heating the same with alkali.

In testimony whereof I have affixed my signature.

KOJI ANJOW.